United States Patent

[11] 3,581,132

| [72] | Inventor | Nikolaus Laing<br>35—37 Hofener Weg. 7141, Aldingen,<br>Germany |
|---|---|---|
| [21] | Appl. No. | 813,096 |
| [22] | Filed | Apr. 3, 1969 |
| [45] | Patented | May 25, 1971 |

[54] ROTATING ELECTRICAL MACHINE
17 Claims, 13 Drawing Figs.

[52] U.S. Cl. ................................................. 310/166,
310/44, 310/181, 310/193, 103/87
[51] Int. Cl. ....................................................... H02k 17/00
[50] Field of Search ............................................ 310/166,
44, !179, 180, 218, 194, 217, 264, 104, 66, 181,
157; 103/87

[56] References Cited
UNITED STATES PATENTS

| 1,585,566 | 5/1926 | Sindc | 310/268 |
| 1,878,534 | 9/1932 | Ovington | 310/157 |
| 2,436,939 | 3/1948 | Schug | 310/157 |
| 3,354,833 | 11/1967 | Laing | 103/87 |
| 3,438,328 | 4/1969 | Laing | 310/104 |
| 3,447,469 | 6/1969 | Laing | 310/166 |

*Primary Examiner*—Milton O. Hirshfield
*Assistant Examiner*—R. Skudy
*Attorney*—Pennie, Edmonds, Morton, Taylor and Adams ABSTRACT: In a rotating electrical machine having a pole ring having poles which extend towards the airgap between the stator and the rotor and which are formed with winding slots extending parallel to the rotor axis, the winding extending radially through the winding slots, the pole surfaces near the airgap are larger than the smallest cross sections of the poles. The armatures of such rotating machines can in known manner be formed by spirally coiled strip. A rotating electrical machine of this kind makes a very good pump motor of the kind wherein a partition provides a sealingtight separation between the driven element and the driving element.

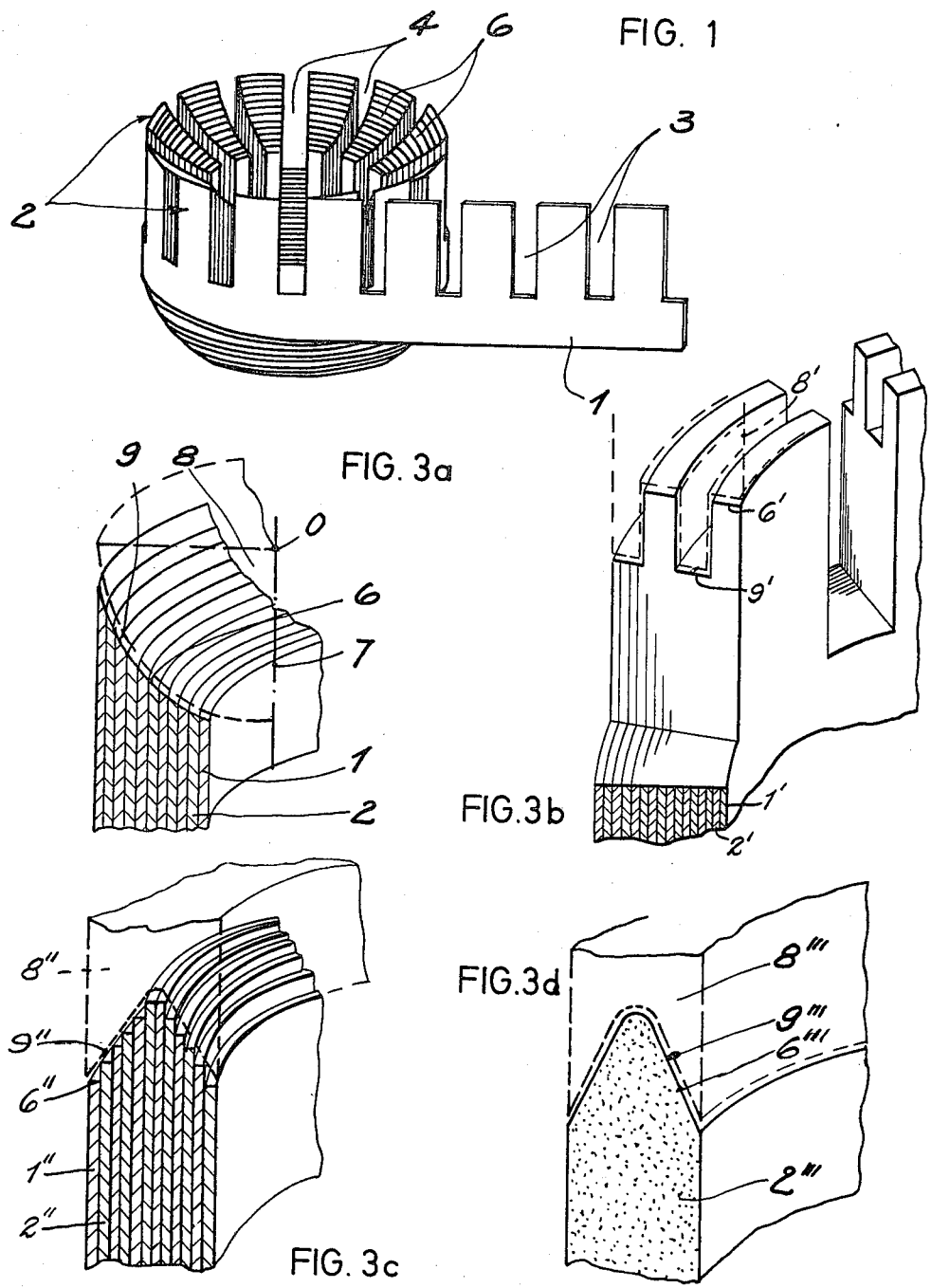

INVENTOR
NIKOLAUS LAING

BY Pennie, Edmonds,
Morton, Taylor & Adams
ATTORNEYS

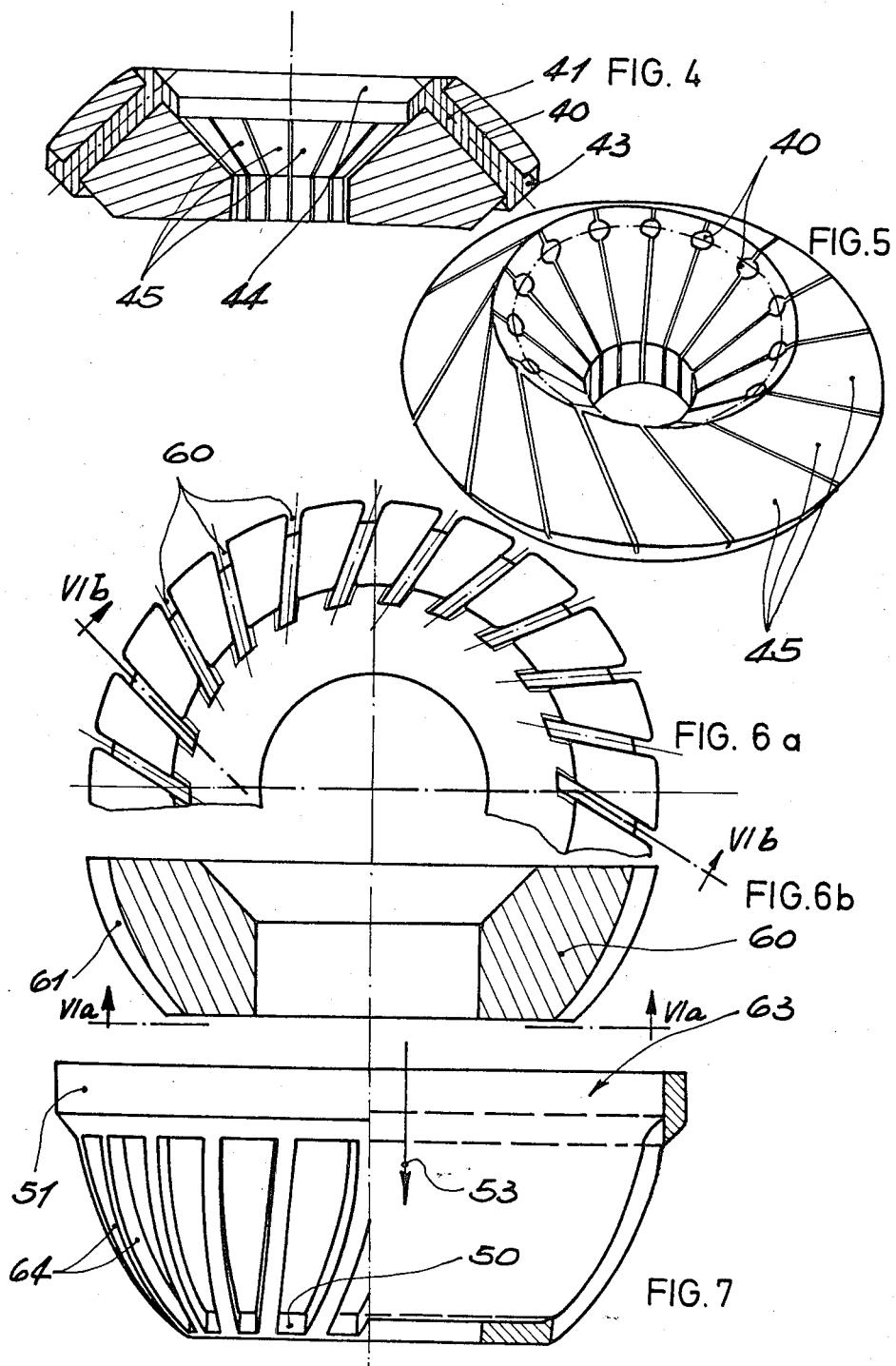

INVENTOR
NIKOLAUS LAING

BY Pennie Edmonds
Morton, Taylor & Adams
ATTORNEYS

ROTATING ELECTRICAL MACHINE

THE PRIOR ART

In axial airgap motors the pole surfaces which are near the airgap between the rotor and the stator and which determine the magnetic flux density are disposed in a radial plane. Since leakages limit the possible flux density in the airgap—a flux density of, for instance, about 3,000 gauss is often used—motors of this kind, despite their other advantages, are suitable only for small magnetic loading and therefore tend to be very large in size. The flux density in the pole itself can be more than 6,000 gauss without magnetic leakage being appreciable. The airgap flux density is therefore always chosen less than the pole flux density, because of magnetic leakage, and so the pole iron is not fully used.

The term "axial airgap motor" refers to an induction motor having a rotor or stator with a core having poles which extend towards the airgap between the rotor and the stator and which bound winding slots extending parallel to the rotor axis, the winding extending radially through the winding slots.

DESCRIPTION OF THE INVENTION

The invention relates to a rotating electrical machine of the kind specified wherein the pole iron can be more heavily loaded than in known electrical machines of this kind without any increase in flux density and, therefore, without any increase in magnetic leakages in the airgap. In other words, it is an object of the invention to reduce, for a given flux density, the pole iron cross sections perpendicularly to the magnetic flux direction in these poles.

According to the invention, therefore, that surface of each pole which is near the airgap is larger than the smallest cross section of the particular pole concerned. If the poles are cylindrical members, according to the invention, the pole surfaces which are near the airgap include with the cylinder axes angles other than 90°. The pole surfaces near the airgap can be plane or curved surfaces. Preferably, the pole surfaces near the airgap are disposed in a conical surface whose center is disposed on the rotor axis.

A preferred rotor or armature for a rotary electrical machine according to the invention has an iron member made of sintered iron segments held together by the cage winding. In another embodiment, the armature is embodied of sintered iron formed with slots receiving the bars of a cage winding.

Preferably, the pole rings for the stator or armature of a rotating electrical machine according to the invention are devised from a spirally coiled strip.

The invention will be described by way of example with reference to the drawings wherein:

FIG. 1 is a perspective view of a pole ring according to the invention produced by the coiling of an endless stamped metal strip;

FIG. 2b is a plan view of the pole ring shown in FIG. 2a;

FIGS. 3a to 3d show various embodiments of individual poles of pole rings for machines according to the invention;

FIG. 4 is a sectioned view of an armature according to the invention built up from sintered-iron segments;

FIG. 5 is a perspective view of the core of the armature shown in FIG. 4;

FIG. 6a is a view in elevation, and on the line VIa-VIa of FIG. 6b, of another embodiment of an armature core of a motor according to the invention;

FIG. 6b is a section on the line VI-VI of FIG. 6a;

FIG. 7 is an elevation of a cage winding for the armature core shown in FIGS. 6a and 6b.

Figure 2A:
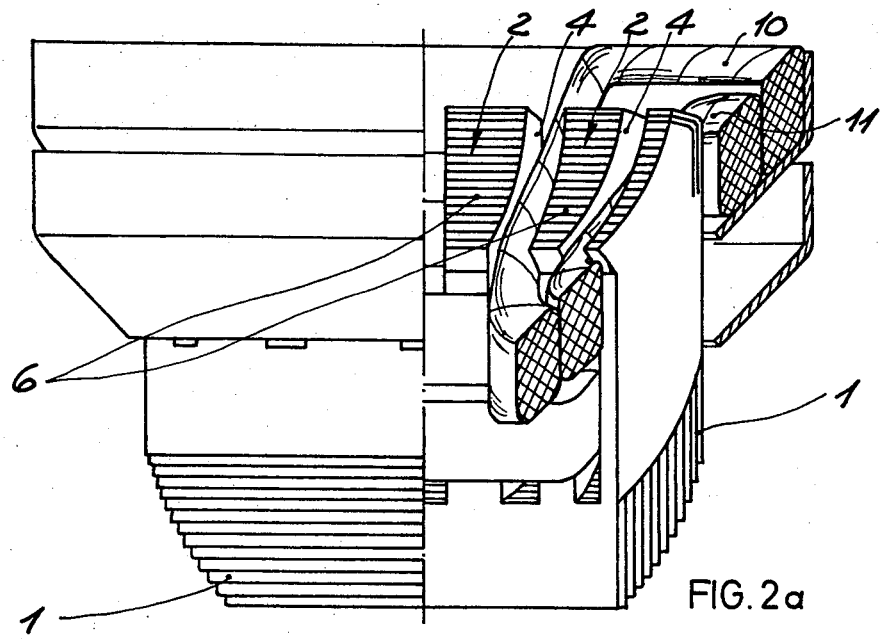
FIG. 2a is a view in partly sectioned elevation, and on the line II-II of FIG. 2b, of the pole ring shown in FIG. 1 but with the winding inserted.

FIG. 1 is a perspective view of a pole ring formed by spirally coiling a metal strip 1. The same is formed with grooves 3 which serve as winding slots 4 extending parallel to the pole-ring axis, and windings (not shown in FIG. 1) extend substantially radially through the slots 4. Strip 1 is coiled in the form of a geometric spiral, but with an axial offset such from layer to layer that those surfaces 6 of the poles 2 which are near the airgap are larger than their smallest cross sections—i.e., larger than the cross section of the poles perpendicularly to the magnetic flux direction in the poles. In the embodiment shown in FIG. 1, the pole surfaces 6 are disposed in a spherical surface.

Figure 2B:
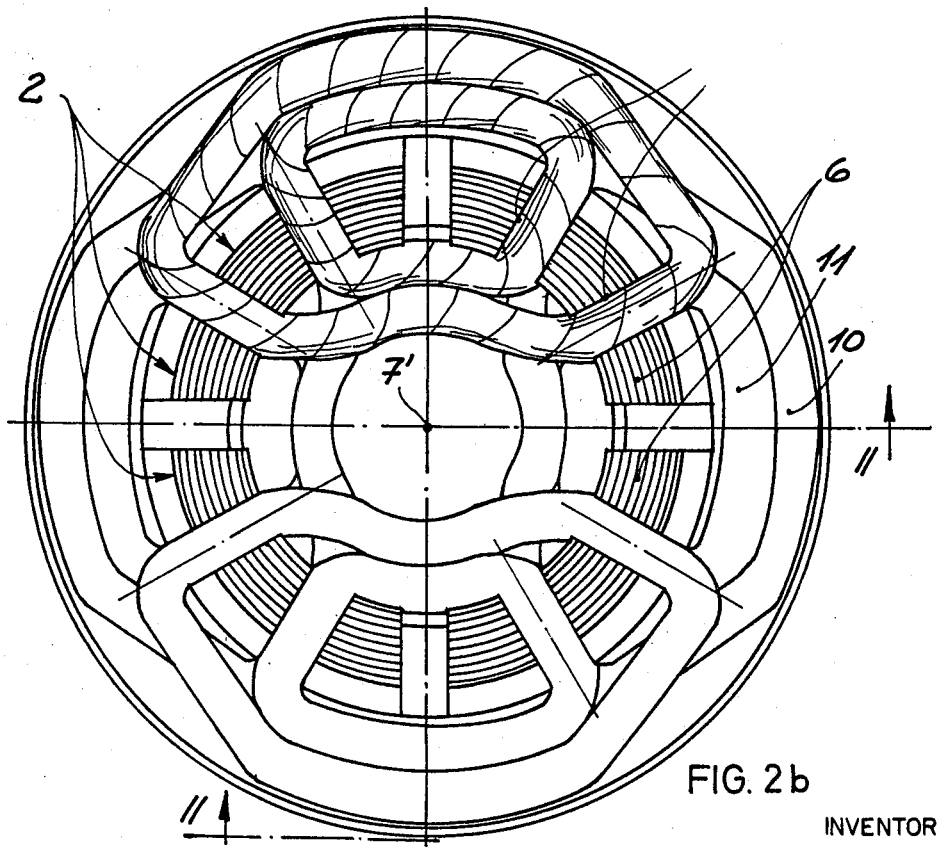

FIGS. 2a and 2b show a pole ring of the kind in FIG. 1 which has been coiled from a metal strip 1. As can be gathered from FIG. 2b, which is a plan view of the pole ring shown in FIG. 2a, the slots 4 receive windings 10, 11. The pole surfaces 6 near the airgap between the stator and the armature are disposed in a spherical surface whose center coincides with the pole-ring axis 7' and with the axis of the rotor (not shown).

FIG. 3a and 3c are axial sections through poles of pole rings wound from metal strips in the manner shown in FIG. 1. The cross section in FIG. 3a is taken through a pole of the pole ring in FIG. 1, the pole surface 6 which is near the motor airgap being disposed on a spherical surface of center 0. The chain lines denote the contour of half of the armature 8 which rotates around axis 7. The armature surface which is near the airgap 9 is also disposed on a spherical surface of center 0.

In the embodiment shown in FIG. 3b, the metal strip 1 is made up of a plurality of soft iron rings 1' which comprise surfaces of rotation extending about the rotor axis with each ring being grooved such that when the rings overlap one another, the resulting pole surface 6' seen radially is pronged or tined; the surface 6' forms that surface of the pole 2' which is near the airgap 9' and, therefore, larger than the smallest cross section of the latter pole. An associated armature 8' cooperates with the pole 2' to bound the airgap 9'.

FIG. 3c shows one pole 2" of a pole ring in cross section, the pole ring having been wound from a metal strip 1" in the manner shown. The stepped form of the pole surface 6" leads to a substantially saddle-shaped airgap 9" bounded by the pole surface 6" and by an armature 8" (shown in chain lines).

FIG. 3d shows an embodiment of a pole 2''' which has in axial section a saddle-shaped surface 6''' cooperating with a rotor 8''' (shown in chain lines) to bound an airgap 9''' ; as in the previous cases, the boundary surfaces of the airgap are larger than the cross section of the sintered pole 2'''.

FIG. 4 shows an armature for a motor according to the invention and embodied from sintered-iron segments 45. Between every two adjacent segments 45 is a slot or channel or the like 40 receiving a bar 41 of a cage winding. The bar 41 is in good electrically conductive connection with short circuit rings 43, 44.

FIG. 5 is a perspective view of the armature of FIG. 4 before the cage winding is cast in. As will be clearly apparent, the armature is built up from segments which the cage-winding rings 44, 43 hold together after casting.

FIGS. 6a and 6b show a sintered-iron ring core 60 for an armature; the part spherical outside is formed with slots 61. As FIG. 7 shows, the core 60 is introduced into a cage winding consisting of a part spherical stamping 63, the cage-winding limbs 64 engaging in the core slots or channels 61. The limbs 64 are interconnected by two magnetic shunt rings 50, 51. The outer diameter of ring 50 is smaller, and the inner diameter of ring 51 is larger, than the corresponding core diameters, so that the core can be introduced into the cage in the direction indicated by an arrow 53.

Figure 8:
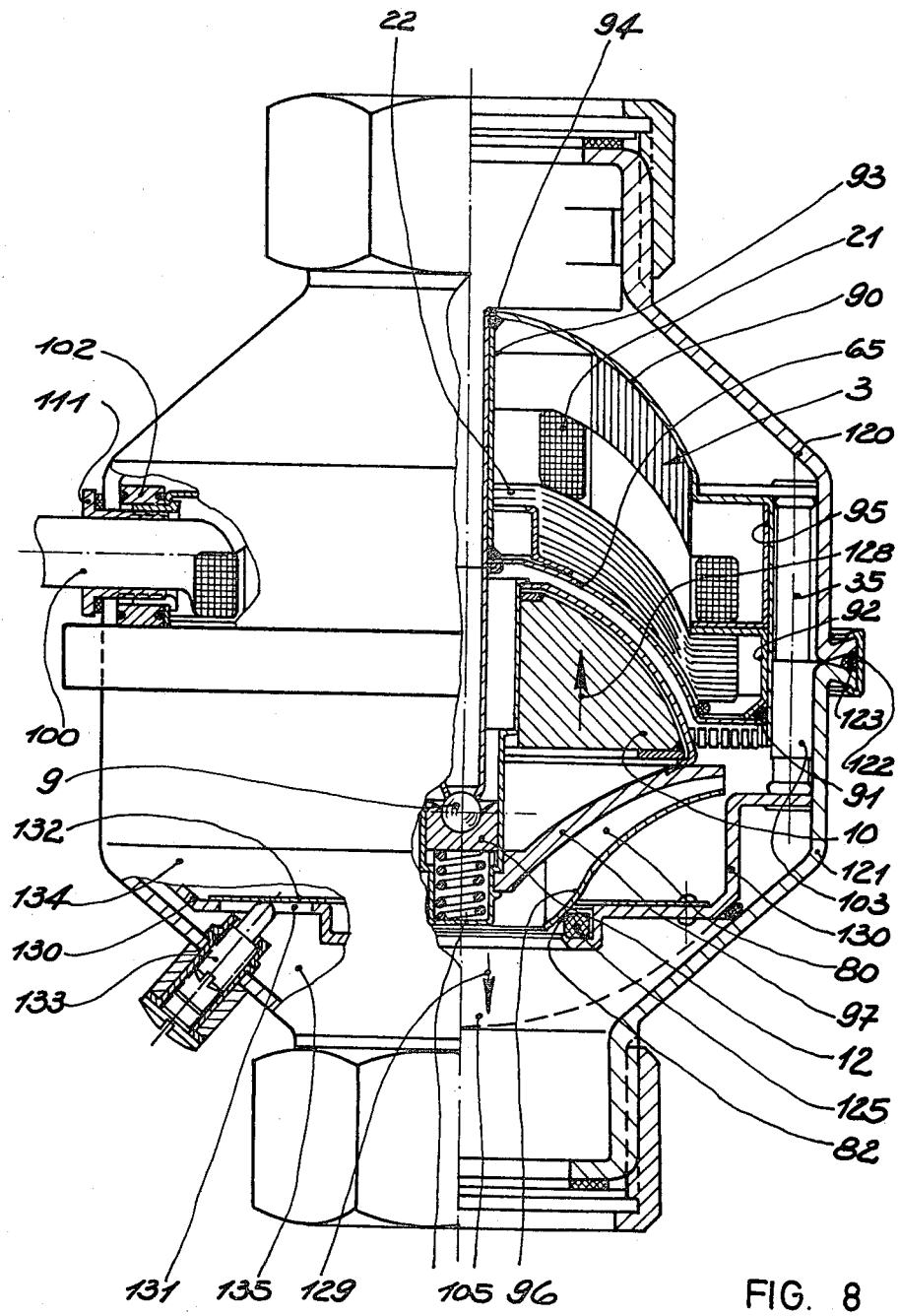
FIG. 8 is a view, partly in section and partly in elevation, of a pump associated with a motor according to the invention.

FIG. 8 shows a pump having a motor according to the invention. The stator 3 is constructed in the manner shown in FIG. 1, and the winding 21 and adjacent winding 22 are disposed in the manner shown in FIGS. 2a and 2b. The motor casing 90 cooperates with a thin partition 65 to bound a watertight enclosure. An aluminum ring 92 presses a rubber ring 91 into the corner zone. A tube 93 widens conically at the ends and cooperates with rubber rings 94 to form a watertight seal. Between ring 92 and casing 90 is an intermediate member in the form of an aluminum ring 95. The radially inwards projecting ring zones of the rings 92, 95 extend as far as the periphery of the iron stator 3 and are therefore disposed between the bottom coil layer 22 and the top coil layer 21, thus ensuring removal of heat from the coils 21, 22 to casing wall 90. Three hollow rivets 35 distributed around the periphery locate casing 90 at a predetermined distance from a ring 130; introduced thereinto is a rubber ring 125 which cooperates with shroud 96 of a pump rotor 97 to bound an annular gap 82. While energized the rotor 10 is attracted in the direction indicated by an arrow 128, and a spring 127 which a socket 12 forces upwards is compressed. Upon deenergization the axial magnetic component indicated by the arrow 128 ceases, whereupon the unit formed by the armature 10, the pump rotor 97, its blading 80 and the shroud 96 is moved by spring 127 in the direction indicated by an arrow 129 and pressed against the ring 125 to reduce noise. If particles of dirt enter the gap 82, the rotor makes a wobbling movement around the bearing ball 9, so that the dirt is removed automatically. The ball 9 and socket 12 are preferably made of materials harder than the hardness of any admixtures likely to be present in the liquid being conveyed. Electrical connections are by way of a cable 100 which is protected from the liquid by screw-threading 111 and a ring 102 bearing two rubber rings; a bypass between the intake side 135 and the delivery side 134 is provided in the form of orifices 131 closable by a preferably resiliently secured ring 132 to prevent flowback of liquid through wall 130. If a lower maximum pressure is required, however, ring 132 is raised by screw 133 so that some of the liquid can flow back from the delivery side 134 to the intake side 135. The pump casing comprises two identical shells 120, 121 which are retained axially by a ring 122 and sealed by a rubber ring 123. Whirl energy is recuperated by a ring 103 of fixed blades which deflects the inflow substantially axially in relation to the pump. Dirt is intercepted by a wire mesh 105.

I claim:

1. A rotating electrical machine having two axially opposite rotatable members with one said member comprising an armature and the other said member a rotor with an airgap therebetween wherein at least one said member has a soft magnetic core and a winding, the core having poles which extend towards the airgap between the members and which bound winding slots extending parallel to the rotor axis, and wherein the windings extend in radial planes through the winding slots characterized in that surface of each pole which is near the airgap is larger than the smallest cross section of the particular pole concerned.

2. A rotating electrical machine as set forth in claim 1, characterized in that the poles are cylindrical members, and the pole surfaces which are near the airgap include with the cylinder axes angles other than 90°.

3. A rotating electrical machine as set forth in claim 2, characterized in that the pole surfaces which are near the airgap are curved surfaces.

4. A rotating electrical machine as set forth in claim 3, characterized in that the curved surfaces (6) are portions of a spherical surface whose center (0) is disposed on the rotor axis.

5. A rotating electrical machine as set forth in claim 3, characterized in that the curved surfaces (6'', 6''') are disposed in cone surfaces whose center is disposed on the rotor axis (7).

6. A rotating electrical machine as set forth in claim 3, characterized in that the curved surfaces (6') have a number of portions, each of which is a section of a surface of rotation around the rotor axis.

7. An armature for an induction machine as set forth in claim 1, characterized in that the iron body is made of sintered iron segments (45) held together by the cage winding (41, 43, 44).

8. An armature for an induction machine as set forth in claim 1, characterized in that the armature is made of sintered iron and is formed along generatrices with slots (61) receiving rods (67) of a cage winding.

9. An armature for an induction machine as set forth in claim 8, characterized in that the cage winding is a stamping (63) in shape resembling a spherical cap.

10. An armature for an induction machine as set forth in claim 9, characterized in that the cage winding has a first magnetic shunt ring (50), whose outer diameter is less than the axis-to-bars distance, and a second magnetic shunt ring (51) is in inner diameter greater than the armature iron core (60).

11. An armature for an induction machine as set forth in claim 1, characterized in that it comprises a spirally coiled strip (1).

12. An armature for an induction machine as set forth in claim 1, characterized in that it comprises grooved soft-iron rings.

13. An armature for an induction machine as set forth in claim 12, characterized in that the rings are combined from half shells or third shells.

14. An induction motor devised as drive for a pump as set forth in claim 1, characterized in that a part spherical partition (65) rigidly connected to the stator is disposed in the airgap.

15. An induction motor devised as drive for a pump as set forth in claim 18, characterized in that the airgap is disposed on the surface of a sphere whose airgap coincides with the center of a support sphere (9) for the pump rotor.

16. An induction motor devised as drive for a pump as set forth in claim 1, characterized in that the pump rotor (10) has provision for limited axial displacement.

17. An induction motor devised as drive for a pump as set forth in claim 18, characterized in that the partition (65) between the stator and the rotor is made of a very thin ferromagnetic material.

PO-1050
(5/69)

UNITED STATES PATENT OFFICE
CERTIFICATE OF CORRECTION

Patent No. 3,581,132      Dated May 25, 1971

Inventor(s) Nikolaus Laing

It is certified that error appears in the above-identified patent and that said Letters Patent are hereby corrected as shown below:

Column 4, line 42, "claim 18" should read --claim 1--.

Column 4, line 43, "airgap" should read --centre--.

Column 4, line 49, "claim 18" should read --claim 1--.

Signed and sealed this 9th day of November 1971.

(SEAL)
Attest:

EDWARD M.FLETCHER,JR.      ROBERT GOTTSCHALK
Attesting Officer      Acting Commissioner of Patents